(12) United States Patent
Barbosa

(10) Patent No.: US 6,343,678 B1
(45) Date of Patent: Feb. 5, 2002

(54) BRAKE HOLD DOWN ASSEMBLY

(75) Inventor: Manuel Barbosa, Novi, MI (US)

(73) Assignee: Akebono Corporation North America, Farmington Hills, MI (US)

( * ) Notice: Subject to any disclaimer, the term of this patent is extended or adjusted under 35 U.S.C. 154(b) by 0 days.

(21) Appl. No.: 09/534,299

(22) Filed: Mar. 23, 2000

(51) Int. Cl.⁷ .............................................. F16D 51/00
(52) U.S. Cl. ..................................................... 188/340
(58) Field of Search .......................... 188/78, 325–341; 248/612; 411/522; 403/155; 267/158; 24/573

(56) References Cited

U.S. PATENT DOCUMENTS

| | | |
|---|---|---|
| 2,352,392 A | 6/1944 | Kost |
| 2,868,484 A | 1/1959 | Burrise |
| 3,189,077 A | 6/1965 | Willis, Jr. et al. |
| 4,623,050 A | 11/1986 | Copp |
| 5,368,139 A | 11/1994 | Pirrallo et al. |
| 5,540,310 A | 7/1996 | Ludtke et al. |

FOREIGN PATENT DOCUMENTS

GB 899061 * 6/1962

* cited by examiner

Primary Examiner—Christopher P. Schwartz
Assistant Examiner—C. J. Bartz
(74) Attorney, Agent, or Firm—Clark & Brody

(57) ABSTRACT

A brake hold down assembly for brake mechanisms has a hold down spring designed to ease spring installation and removal as well as reduce spring overstressing. Each leg of the spring has an open-ended slot therein, and the assembly also includes a retaining pin, which interfaces with the open-ended slot in each leg to lock the spring in place after installation. The spring is preferably p-shaped with a pair of opposing legs connected by an arcuate portion.

18 Claims, 2 Drawing Sheets

BRAKE HOLD DOWN ASSEMBLY

FIELD OF THE INVENTION

The invention is directed to a unique configuration for providing engagement between a pin and a spring, which finds particular utility as a hold-down assembly for a vehicle brake. In accordance with another feature of the invention, the spring is p-shaped to minimize overstressing of the spring during assembly and disassembly of the brake mechanism and to prevent unintended spring disengagement.

BACKGROUND ART

Various hold down devices and assemblies have been proposed to facilitate assembly and disassembly of brake mechanisms. One such assembly is designated by the reference numeral 10 in FIGS. 1A–1C. The assembly comprises a u-shaped spring 1 and a retaining pin 3. The spring 1 has a pair of slots 5 and 7 to allow the pin 3 to pass therethrough. The slot 5 in leg 9 of the spring is elongated and recesses 13 are provided on opposite sides of the longer side of the slot 5. A cap 15 is provided on one end of the pin 3, and a stop 17 is provided on the other end. The stop 17 is elongate and sized to pass through the narrower dimension of the slot 5 when the pin is in a first orientation and to engage the recesses 13 when the pin is rotated to a second orientation 90 degrees from the first orientation. With the pin in the second orientation, the spring 1 and pin are locked together by reason of the spring force urging the upper leg 9 against the stop 17 at one end and against the backing plate 23 at the other. Thus, this spring assembly holds the brake shoe 21 in position against the backing plate. The brake shoe can be removed by disengaging the pin 9 from the spring 1 by compressing the spring and rotating the spring with respect to the pin to align the stop 17 with the slot 5.

The prior art design shown in FIGS. 1A and 1B is not without its disadvantages. Referring to FIG. 1C, the spring 1 can be overstressed at 25 where the arcuate portion 27 joins the leg 9. In this configuration, only the ends of the legs 9 and 12 contact each other. A substantial part of leg 9 is unsupported and vulnerable to permanent set if the pin load is too great. Further, this overstressing can also contribute to spring and brake mechanism failure.

Other commonly-utilized hold down assemblies have a coil spring and a retaining pin. Like the FIG. 1 assembly, these coil spring-containing assemblies require rotation of the spring or pin for disassembly. Further, the coil spring can be difficult to grab and rotate for removal. Constant removals and installations of these types of springs can also contribute to carpal tunnel syndrome in brake technicians.

U.S. Pat. No. 5,540,310 to Ludtke et al. shows another type of spring and pin arrangement for holding down brake components. In Ludtke et al., the spring has a u-shape similar to that shown in FIG. 1A; however, Ludtke et al. employ a slot in one leg of the spring to facilitate installation and removal of the spring. Ludtke et al. also use a well or recess to maintain engagement between the end of the pin and the spring. However, if the pin end rises up out, of the recess, the spring can disengage from the pin and compromise operation of the brake mechanism.

In light of the disadvantages of the prior art assemblies used in present day brake mechanisms, a need has developed to provide improved hold-down assemblies. The present invention solves this need by providing an improved brake hold down assembly that provides a positive locking mechanism and further eliminates overstressing experienced by prior art springs to minimize the possibility of permanent set or yield during spring compression.

SUMMARY OF THE INVENTION

Accordingly, an object of the present invention is a brake hold down assembly employing a positive locking feature to avoid disengagement between the hold down spring and retaining pin.

A further object of the present invention is to provide an improved brake hold down assembly.

Another object of the present invention is a hold down assembly that avoids overstressing of the assembly's spring component during removal or installation.

Other objects and advantages of the present invention will become apparent as a description thereof proceeds.

In satisfaction of the objects, the invention provides a unique engagement between opposing legs of a spring, which are preferably p-shaped. The spring includes open-ended slots for receiving a retaining pin having a head shaped to cooperate uniquely with the shape of the slot. Thus, an elongate pin body has a cap at each end. At one end, the pin includes a shoulder adjacent a cap. The shoulder is wider than the pin body, but narrower than the adjacent cap. One of the opposing legs of the spring includes an opening at an inward termination of a slot that is slightly wider than the shoulder so that the shoulder can be received in the opening after the pin is slid through the slot and into the opening. When the pin has been moved through the slot and the shoulder is engaged in the opening, engagement between the shoulder and the side of the opening prevents movement of the retaining pin out of the slot and consequent disengagement of the pin from the spring.

A still further aspect of the invention is the combination of a p-shaped spring and the retaining pin for use in a brake mechanism. The p-shaped spring preferably has two parallel, opposed legs and an arcuate portion connecting the legs. The spring is generally p-shaped viewed from the side when the opposing legs are pressed together, which reduces overstressing of the spring during compression.

BRIEF DESCRIPTION OF THE DRAWINGS

Reference is now made to the drawings of the invention wherein.

DESCRIPTION OF THE PREFERRED EMBODIMENTS

Figure 1A:
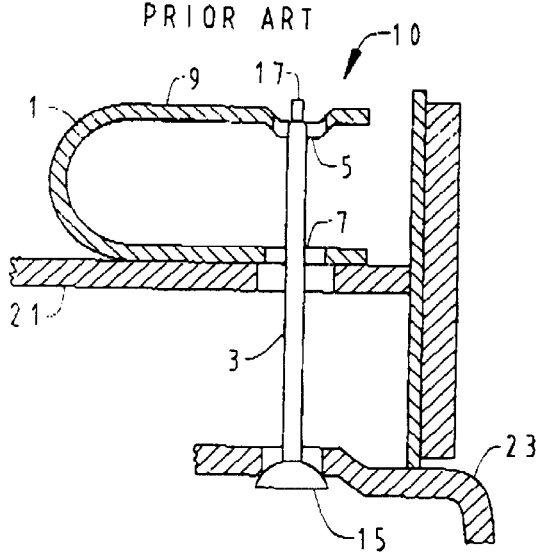
FIG. 1A is a cross sectional view of part of a brake mechanism including a prior art brake hold down assembly.
Figure 1B:
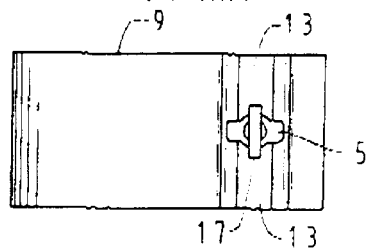
FIG. 1B is a top view of the spring of FIG. 1A.

The present invention offers significant advantages over prior art brake mechanism hold-down assemblies. First, the inventive assembly provides a unique, positive-locking engagement between a spring and a retaining pin, which overcomes the disadvantage of prior art designs where accidental disengagement of the spring from the pin can occur. Further, the inventive design eliminates or greatly reduces the overstressing of spring components found in prior art assemblies.

The spring-pin arrangement of the invention is easier to install because it can employ a lower spring rate than prior art designs. Installation does not require rotational motions by a mechanic, reducing the likelihood of exacerbating or causing carpal tunnel syndrome. Also, the possibility of creating permanent set in the spring is greatly reduced because the spring is not subjected to the large loads required to compress prior art springs.

While the invention may have alternative embodiments, one embodiment of the invention is depicted in FIGS. 2–8. Referring now to FIGS. 2–6, the inventive assembly is generally designated by the reference numeral 30 and includes a spring 31 and a retaining pin 33.

Figure 2:
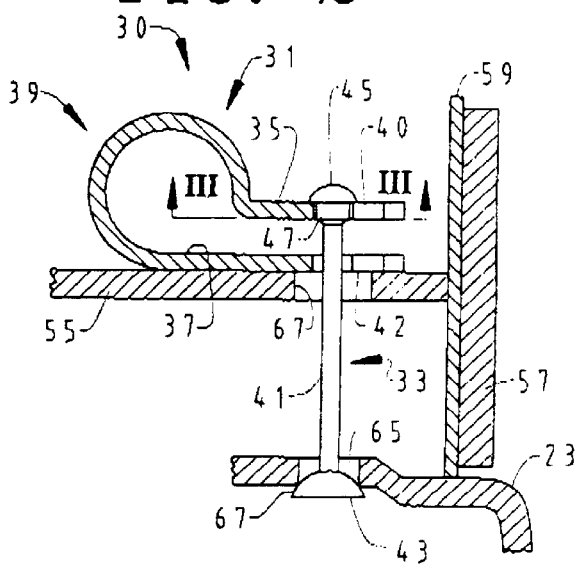
FIG. 2 is a cross sectional view of part of a brake assembly showing one embodiment of the invention.
Figure 4:
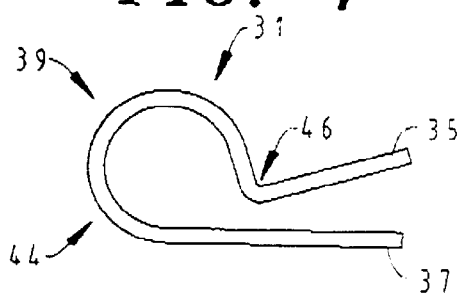
FIG. 4 is a side view of the spring component of the assembly of FIG. 2.

With reference to FIGS. 2 and 4, the spring 31 preferably includes a pair of legs 35 and 37, which are connected by an arcuate portion 39. Each of the legs 35 and 37 has a respective slot 40 and 42. The slots allow the retaining pin 33 to engage the spring 31 as explained in more detail below. The spring is shown in FIG. 4 in its rest state where legs 35 and 37 diverge from each other.

It will be appreciated that leg 37 extends from arcuate portion 39 at a small angle as shown at 44, while leg 35 extends from the other end of portion 39 at a substantial angle, as shown at 46. The arcuate portion 39 extends over an arc of about 270 degrees between the legs 35 and 37, which can be contrasted with an arc of about 180 degrees in the prior art spring of FIG. 1A. While a 270 degree arc is preferred, the arc can range from about 250–290 degrees.

Figure 3:
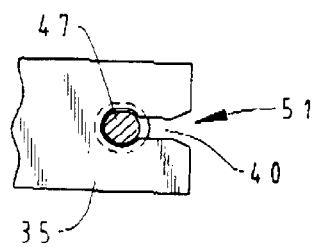
FIG. 3 is a view along the lines III—III of FIG. 2.
Figure 6:
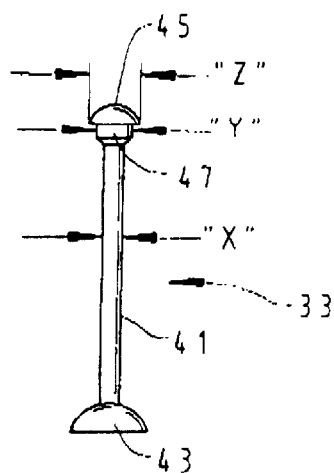
FIG. 6 is a side view of the pin of the assembly of FIG. 2.

Referring to FIGS. 2, 3, and 6, the retaining pin 33 of the invention includes an elongate pin body 41, a cap 43 on one end of the body 41 and another cap 45 at the other end. Adjacent the cap 45 is a shoulder 47. The width of the pin body 41 is designated "X", the width of the shoulder 47 is designated "Y" and the width of the cap is designated "Z". The width "Y" is greater than the width "X" and less than "Z". The several widths function to retain the pin 33 in the slot in a positive locking engagement as explained below.

Figure 5:
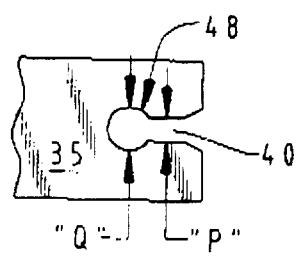
FIG. 5 is a top view of a free end of the spring of FIG. 4.

Referring now to FIGS. 2, 3, and 5, the slot 40 in leg 35 terminates in opening 48, which has a width "Q" greater than the width of slot "P". Width "Q" of opening 48 is larger than the width of shoulder 47 whereby it securely receives the shoulder 47.

The width "P" of slot 40 is slightly larger than the width of the elongate pin body 41 thus allowing the pin body to slide along the slot during installation or removal of the pin when the shoulder 47 has been disengaged from the opening 48. As shown in FIGS. 3 and 5, the slot 40 can have an enlarged or chamfered entrance at 51 to receive the pin body 41 easily during installation of the pin.

FIG. 2 shows the spring 31 with the pin 33 installed such that the spring is compressed. In this mode, the spring's legs 35 and 37 are held between the underside of the cap 45 of the pin 33 and a surface of a brake component plate 55. The plate 55 shown is part of a brake shoe with the lining 57 attached to the lining substrate 59. The spring leg 37 urges the plate 55 against the backing plate 23 with the leg 35 held in place and biased against the underside of the cap 45. The cap 45 prevents expansion of leg 35 and is held against the force applied by the spring to leg 35 by engagement of the other cap 43 against the backing plate 61 at surface 67.

The retaining pin 33 is locked in place in leg 35 by engagement between shoulder 47, formed by a surface external to the pin, and opening 48, formed by a surface internal to the leg and extending from the upper surface of the leg to the lower. Because the width of shoulder 47 is greater than the width of the slot 40, i.e., "Q">"P," the pin cannot become dislodged when the spring is in the configuration shown in FIG. 2.

Figure 9A:
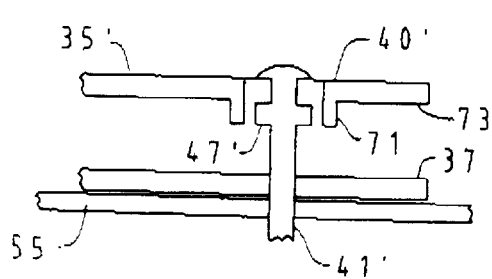
FIGS. 9A and 9B show an alternative locking arrangement for the inventive assembly.
Figure 9B:
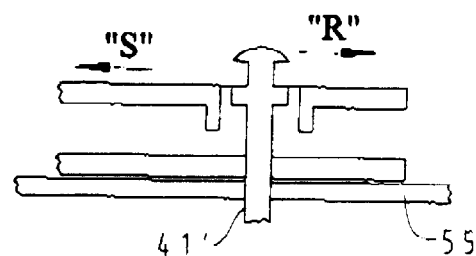

Although the shoulder 47 is depicted adjacent the cap 45, it could be located on the pin body elsewhere as long as one of the legs 35 or 37 is configured to block the travel of the shoulder when the pin is biased between the cap 45 and the plate 55. Referring to FIGS. 9A and 9B, the shoulder 47' on the pin body 41' could be spaced from the underside of cap 45, and the leg 35' could include protrusions 71 extending from the bottom 73 of the leg 35'. The slot 40' would be wide large enough to accommodate the shoulder 47'. Compression of the leg 35' as shown in FIG. 9B would allow the shoulder to slide out the slot 40' in the direction "R" for disengaging the pin by moving the spring in direction "S". If it is desirable to have the legs 35' and 37 contact each other when compressed, the leg 37 could have cut outs to receive the protrusions 71.

A significant advantage of the invention is the engagement between the shoulder 47 and the opening 48 in the leg 35. This engagement prevents disengagement of the pin 33 from the spring 31 because the shoulder 47 is too large to slide through the slot 40. The shoulder 47 is adjacent the cap 45 whereby the spring bias of the leg 35 against the cap 45 retains the shoulder 47 in the opening 48.

Figure 7:
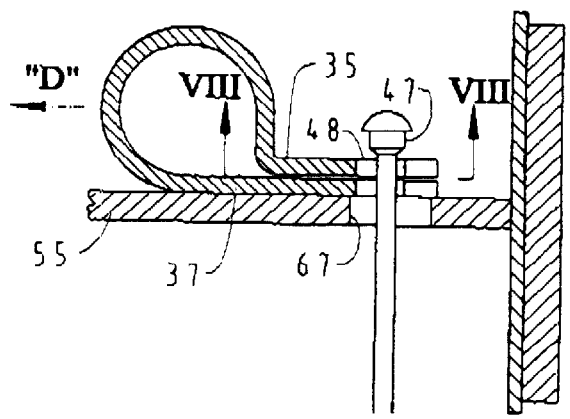
FIG. 7 shows the assembly of FIG. 2 fully compressed.
Figure 8:
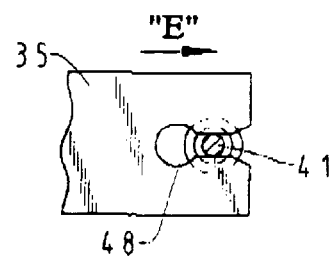
FIG. 8 is a view along the lines VIII—VIII of FIG. 7.

The inventive assembly also facilitates removal of the spring 31 as well. With reference to FIGS. 7 and 8, the spring 31 can be removed by pressing the leg 35 against the leg 37, which moves the shoulder 47 out of the opening 48 and aligns the narrower pin body 41 with the slot 40, see FIG. 8. Since the width "P" of the slot 40 is large enough to allow movement of the pin body 41 therein, depressing the leg 35 allows the spring 31 to be slid in the direction "D" and the pin body 41 to travel in the direction "E" out of the slots 40 and 42 of the legs 35 and 37, respectively. Once the hold down spring 31 and retaining pin 33 are removed, the brake component can be removed and replaced.

Figure 1C:
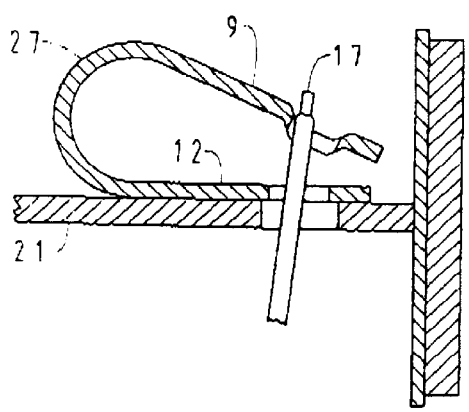
FIG. 1C shows part of the hold down assembly of FIG. 1A in a compressed state.

Because the arcuate portion 39 includes a larger arc length than prior art designs, i.e., the leg 35 forms an angle with respect to the arcuate portion at 46 (FIG. 4), less stress is applied to the spring 31 in its compressed state. It will be appreciated that the spring shown in FIG. 1C is more stressed and that a permanent set can occur in such a spring. This contrasts with the inventive configuration, which reduces overstress on the spring. In the configuration illustrated in FIG. 2, the legs 35 and 37 face each other to engage along their entire lengths when fully compressed, as shown in FIG. 7, thereby preventing permanent set in the spring 31 when manipulated for spring removal or installation. The motion of legs 35 and 37 during compression also reduces the likelihood of aggravating or causing carpal tunnel syndrome because spring or pin rotation is not necessary for removal.

Installation of a new brake component would follow the removal procedure described above but in reverse. The pin 33, if completely removed, would first be inserted through the opening 65 in the backing plate, and the opening 67 in the plate 55. Then, the spring leg 35 would be compressed and the spring 31 slid onto the retaining pin 33. The pin body 41 then slides in the slots 40 and 42. The leg 35 would be released so that the spring is partially uncompressed whereby the shoulder 47 engages the opening 48 in the leg 35. The spring 31 is then locked onto the pin 33 by engagement between the shoulder and the hole until the leg 35 is again depressed for spring removal.

It will be appreciated that the cross sectional shapes of the shoulder and opening can be non-circular. For example, the shoulder 47 could have a square or octagonal cross section with the opening 48 having a corresponding shape to assure that the shoulder interlocks in the opening when the spring expands. Likewise, although the pin body can be circular, square, rectangular, hexagonal or another shapes as would be within the skill of the artisan can be employed.

The spring can be made out of any material having the necessary strength and spring constant to hold down the brake component on the backing plate. Similarly, the pin can be made of any material capable of withstanding the forces applied by the spring.

As is evident from FIGS. 2–8, the hold down assembly is particularly adapted for brake mechanisms employing brake shoes. However, the inventive assembly can be used in any brake mechanisms that would require the need for hold down springs and retaining pins, whether they are brake shoes, pads, or other types of brake components.

As such, an invention has been disclosed in terms of preferred embodiments thereof which fulfills each and every one of the objects of the present invention as set forth above and provides a new and improved brake hold down assembly. It will be appreciated by those of skill in the art that the inventive engagement may find uses in other environments as well.

Of course, various changes, modifications and alterations from the teachings of the present invention may be contemplated by those skilled in the art without departing from the intended spirit and scope thereof. It is intended that the present invention only be limited by the terms of the appended claims.

What is claimed is:

1. In a brake mechanism having a spring with opposed legs and a retaining pin extending through said legs to hold down a brake component, the improvement wherein each of said legs has a slot for receiving a body portion of said pin and one of said legs has an opening connected with a said slot for receiving a shoulder on said pin, wherein said opening is formed by a surface internal to said one of said legs, said surface further extending through said one of said legs from an upper surface of said one of said legs to a bottom surface thereof and said shoulder is formed by a surface external to said pin and wider than said slot and contiguous to said internal surface.

2. The mechanism of claim 1, wherein one of the opposing legs is angled with respect to one end of an arcuate portion and the other opposing leg is generally aligned with the other end of the arcuate portion to form a generally p-shaped cross section.

3. The mechanism of claim 1, wherein the retaining pin further comprises a pin body having a cap on each end and a shoulder adjacent one of the caps, the width of the shoulder being greater than the width of the pin body, and wherein the width of the opening corresponds generally to the width of the shoulder, whereby when the shoulder is engaged in the opening the shoulder prevents the retaining pin from moving out of the slot and disengaging from the spring.

4. The mechanism of claim 3, wherein the shoulder is cylindrical and the opening is circular.

5. The mechanism of claim 1, wherein the slot having the opening is flared at an end opposite the opening.

6. The mechanism of claim 4, wherein the shoulder is adjacent one of the caps.

7. A brake hold down assembly comprising:
   a) a generally p-shaped spring having opposing legs connected by an arcuate portion, each leg having an open-ended slot therein, one leg having the open-ended slot with a first width; and
   b) a retaining pin comprising a pin body having a cap on each end, and a shoulder adjacent one cap, the shoulder having a second width greater than the first width of the open-ended slot of the one leg, the one leg including an opening at a termination of the slot, the opening having a third width corresponding generally to the second width of the shoulder, the shoulder blocking the retaining pin from traveling out of the slot and disengaging from the spring when the shoulder is engaged in the opening;
   c) the spring and the retaining pin adapted to hold a brake component against a backing plate with the spring being arranged between one pin cap and the brake component.

8. The assembly of claim 7, wherein the shoulder is cylindrical and the opening is generally circular in shape.

9. The assembly of claim 7, wherein the shoulder is a rectangular prism and the opening is generally square in shape.

10. The assembly of claim 8, wherein the first width of the open-ended slot increases at a free end of each opposing leg.

11. The assembly of claim 8, wherein the arcuate portion defines an arc ranging between about 250 and about 290 degrees.

12. The assembly of claim 8, wherein the shoulder is adjacent one of the caps.

13. A spring adapted for use in a brake hold down assembly comprising opposing legs connected by an arcuate portion, each leg having an open-ended slot therein, the open-ended slot of one leg having a first width, the one leg including an opening at a termination of the slot, the opening having a second width greater than the first width, the opposing legs and arcuate portion being generally p-shaped when the opposing legs are compressed together.

14. In a brake mechanism having at least one spring and a retaining pin to hold down a brake component of the brake mechanism, the improvement comprising the spring having opposing legs and an arcuate portion connecting the opposing legs, and the retaining pin further comprises a pin body having a cap on each end and a shoulder extending from the pin body, the shoulder being formed by a surface external to the pin and having a width dimension greater than a width dimension of the pin body, and each of the opposing legs has an open-ended slot to receive the pin body, one opposing leg including an opening at a termination of the open ended slot, the opening being formed by a surface internal to the leg and having a width dimension corresponding generally to the width of the shoulder, the open-ended slot of the one opposing leg having an enlarged open end, the shoulder when engaged with the opening blocking the retaining pin from traveling out of the open-ended slot and becoming disengaged from the spring.

15. In a brake mechanism having at least one spring and a retaining pin to hold down a brake component of the brake mechanism, the improvement comprising the spring having opposing legs and an arcuate portion connecting the opposing legs, and the retaining pin further comprises a pin body having a cap on each end and a shoulder extending from the pin body, the shoulder being formed by a surface external to the pin and having a width dimension greater than a width dimension of the pin body, and each of the opposing legs has an open-ended slot to receive the pin body, one opposing leg including an opening at a termination of the open ended slot, the opening being formed by a surface internal to the leg and having a width dimension corresponding generally to the width of the shoulder, the open-ended slot of the one opposing leg having an enlarged open end, the shoulder when engaged with the opening blocking the retaining pin from travelling out of the open-ended slot and becoming disengaged from the spring.

16. A mechanism according to claim 15 wherein the spring is generally p-shaped in cross section when the opposing legs are compressed together.

17. In a brake mechanism having a spring with opposed legs and a retaining pin extending through said legs to hold down a brake component, the improvement wherein each of said legs has a slot for receiving a body portion of said pin and one of said legs has an opening connected with a said slot for receiving a shoulder on said pin, one of the opposing legs is aligned with respect to one end of an arcuate portion, and the other leg is generally aligned with the other end of the arcuate portion to form a generally p-shaped cross section.

18. In a brake mechanism having at least one spring and a retaining pin to hold down a brake component of the brake mechanism, the improvement comprising the spring having opposing legs and an arcuate portion connecting the opposing legs, and the retaining pin further comprises a pin body having a cap on each end and a shoulder extending from the pin body, the shoulder having a width dimension greater than a width dimension of the pin body, and each of the opposing legs has an open-ended slot to receive the pin body, one opposing leg including an opening at a termination of the open ended slot, the opening having a width dimension corresponding generally to the width of the shoulder, the open-ended slot of the one opposing leg having an enlarged open end, the shoulder when engaged in the opening blocking the retaining pin from traveling out of the open-ended slot and becoming disengaged from the spring, wherein the spring is generally p-shaped in cross section when the opposing legs are compressed together.

* * * * *

UNITED STATES PATENT AND TRADEMARK OFFICE
CERTIFICATE OF CORRECTION

PATENT NO.     : 6,343,678 B1
DATED          : February 5, 2002
INVENTOR(S)    : Barbosa It is certified that error appears in the above-identified patent and that said Letters Patent is hereby corrected as shown below:

<u>Column 6,</u>
Line 42, should read:
14. The spring of claim 13, wherein each leg has a length such that opposing surfaces of each leg are generally parallel to each other when the opposing legs are compressed together.

Signed and Sealed this

Seventeenth Day of September, 2002

*Attest:*

JAMES E. ROGAN
*Attesting Officer*  *Director of the United States Patent and Trademark Office*